Sept. 30, 1958  M. SCHWAB  2,853,967
CONTROL MEANS FOR AN AUXILIARY DRIVE IN A WORK MACHINE
Filed Dec. 2, 1952  3 Sheets-Sheet 1
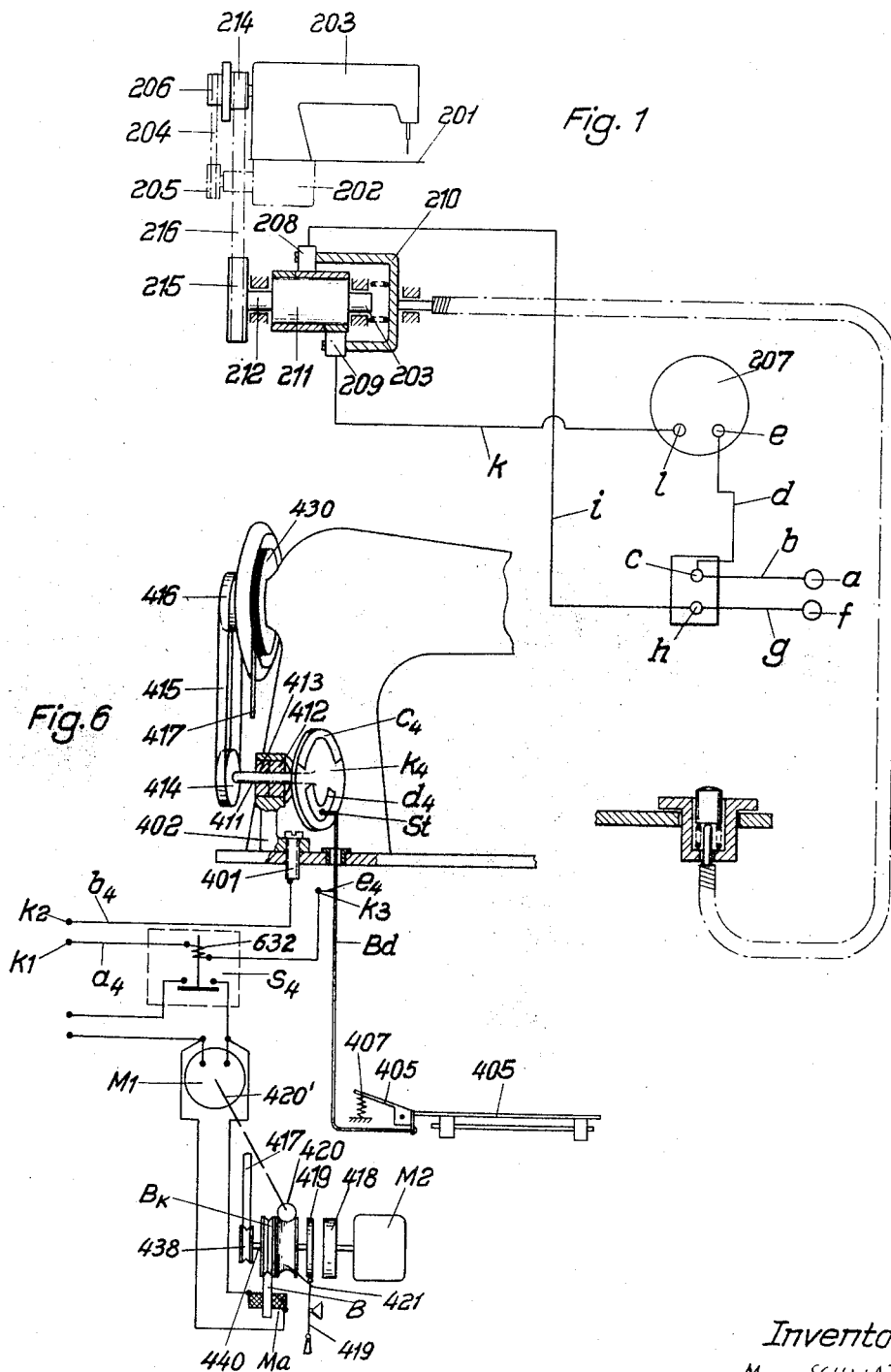
Inventor:
Max SCHWAB Sept. 30, 1958     M. SCHWAB     2,853,967
CONTROL MEANS FOR AN AUXILIARY DRIVE IN A WORK MACHINE
Filed Dec. 2, 1952     3 Sheets-Sheet 2
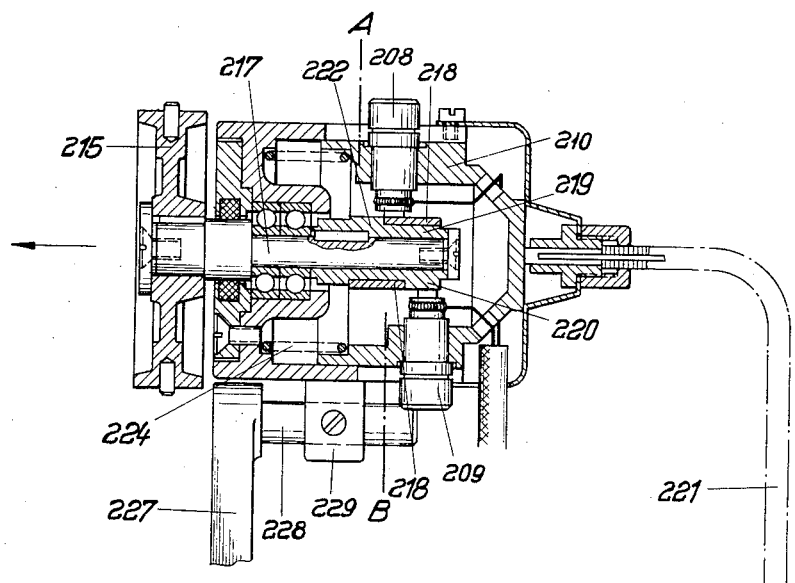
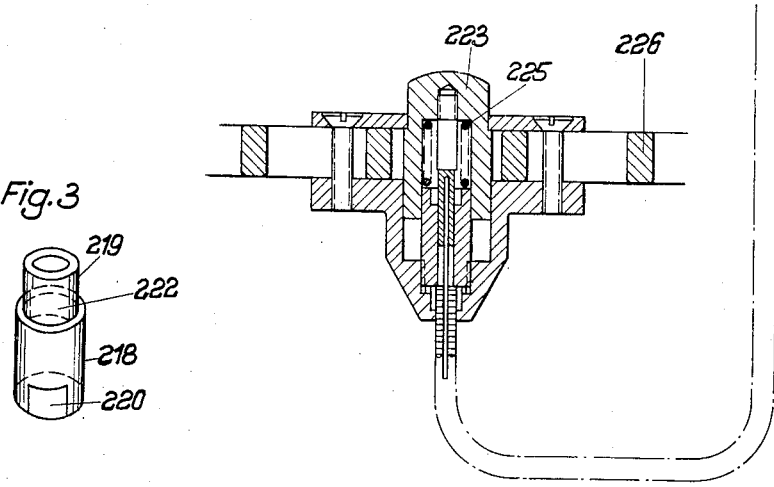
Inventor:
Max SCHWAB
Attorney Sept. 30, 1958 M. SCHWAB 2,853,967
CONTROL MEANS FOR AN AUXILIARY DRIVE IN A WORK MACHINE
Filed Dec. 2, 1952 3 Sheets-Sheet 3
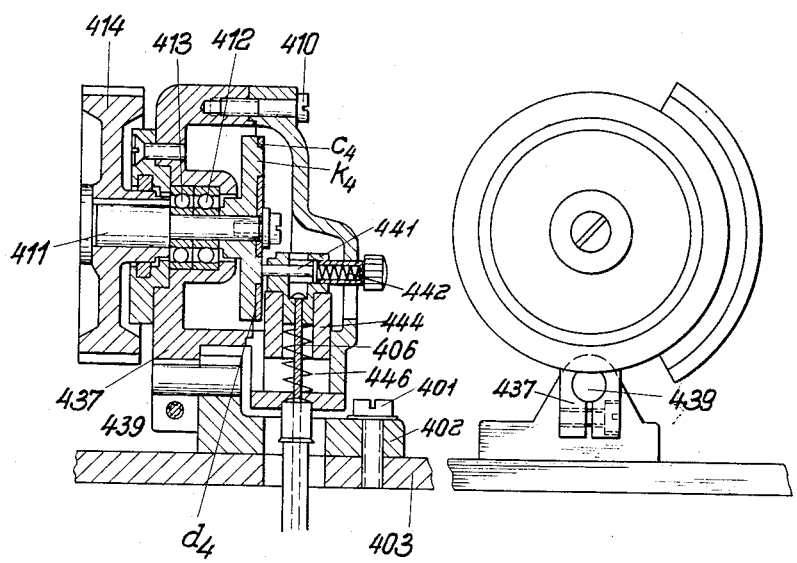
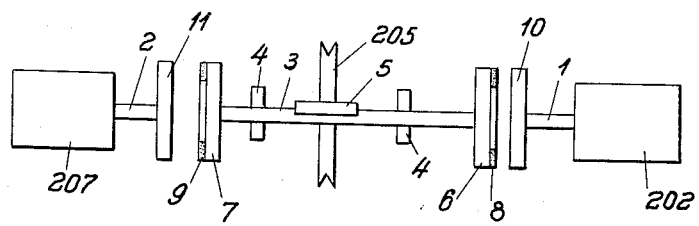
Inventor:
Max SCHWAB
Attorney United States Patent Office 2,853,967
Patented Sept. 30, 1958

2,853,967
CONTROL MEANS FOR AN AUXILIARY DRIVE IN A WORK MACHINE

Max Schwab, Schwetzingen, Baden, Germany; Olga Brunhilde Schwab administratrix of said Max Schwab, deceased Application December 2, 1952, Serial No. 323,566

Claims priority, application Germany June 20, 1952

4 Claims. (Cl. 112—219)

This invention relates to control means for machines equipped with a main motor which may be switched off either mechanically or electrically and causes the normal working movement, and an auxiliary motor inserted after the switching off of the main motor, which might cause the stopping of the machine in any position of the parts thereof, the auxiliary motor driving the machine until the same has reached a predetermined rest position.

It is an object of the present invention to simplify in machines of the kind described hereinabove, and more particularly in sewing machines, the control of the auxiliary motor and to design the same in such a manner that various rest positions of the machine can be predetermined by simple means.

Thus according to the present invention electric switching means are provided the movable parts of which are connected with the machine by a synchronous driving connection and the contacts of which are arranged in a circuit controlling the exact stopping of the auxiliary motor, the contacts carrying out in this circuit the switching operations required for this purpose as soon as the movable parts of the switching means have arrived in a position corresponding to the desired rest position of the machine; in connection therewith furthermore adjusting means are provided on at least one of the movable parts of the switching means, the adjusting means permitting to change at will the distance covered by the parts of the switching means relatively to one another, before the contacts reach the switching position required for the stopping of the auxiliary motor.

Another object of the invention is to adapt the said control in a very simple manner whereby it can be readily adjusted for selectively causing the auxiliary drive to bring the needle of a sewing machine into either the up or the down position as may be required. The adjusting means for this purpose may comprise a Bowden wire connection operated by a press button or lever device which may be mounted on an existing control pedal of the machine.

Another object of the invention is to effect the control by the aid of an adjustable commutator-device adapted for cutting out the auxiliary drive either in the needle up or needle down position. Such commutator device advantageously comprises a contact disc with suitably distributed insulation segments and a brush device adjustable radially of said disc into the circular path of one or the other of said segments. With this construction the commutator device can be of particularly small dimensions so that it can be conveniently mounted on the machine without being obstructive.

A further object is to control the auxiliary motor from the commutator device through the medium of a relay, whereby a low voltage circuit can be used for such commutator device with a further simplification of the wiring.

Further objects and advantages will appear from the following description of practical arrangements illustrated by way of example in the annexed drawings, wherein:

Figure 1 is a diagrammatic view partly in section of an installation comprising a sewing machine with its main motor and driving gear seen in outline in elevation;

Fig. 2 is a vertical longitudinal section of a suitable construction of commutator and press button device of the kind of Fig. 1;

Fig. 3 is a perspective view of a cylindrical contact member of Fig. 2;

Fig. 4 is a vertical section of a modified construction of commutator device;

Fig. 5 is an end elevation as seen from the left hand side of Fig. 4, and

Fig. 6 is a diagrammatic view, somewhat similar to Fig. 1, but showing the commutator of Figs. 4 and 5 controlling the auxiliary motor through the medium of a low voltage relay.

Figure 7 is an enlarged view illustrating the method of arranging the main motor 202 and the auxiliary motor 207, and the means for alternatingly connecting these motors to the drive shaft of the sewing machine 203.

In Fig. 1, a table plate 201 of a sewing machine 203 has mounted beneath it a main motor 202 for the normal driving of the machine. Thus, the shaft of the motor 202 may carry a pulley or sprocket 205 driving a belt or chain 204 running around a pulley or sprocket 206 on the drive shaft of the machine. An auxiliary motor 207 is arranged so that it also can drive the pulley 205 and continue to turn the latter, after the motor 202 has been switched off, until the needle has been brought into the up or the down position as may be desired.

Figure 7 illustrates the manner of arranging the main motor and auxiliary motor for alternately driving the sewing machine. As illustrated in Figure 7: the main motor 202 instead of being directly connected to the sprocket 205 is provided with a stub shaft 1. An auxiliary motor 207 is provided with a stub shaft 2. A sliding shaft 3 is mounted in bearings 4 in between the shafts 1 and 2, and is adapted to be shifted to the right or left as viewed in Figure 7, by shifter means which are well known and are not illustrated. The sliding shaft 3 has a pair of oppositely disposed clutch disks 6 and 7 having facings 8 and 9, and the stub shafts 1 and 2 have clutch disks 10 and 11, respectively, facing the disks 6 and 7. The pulley 205 is movable longitudinally with respect to the shaft 3, a key 5 being provided for this purpose. It is thus seen that the shaft 3 can be shifted to the left or right to alternately engage one of the motors 202 or 207.

The auxiliary motor circuit comprises terminals *a* and *f* which are connectable with a source of electric current of suitable voltage. Current passes from *a* through a line *b* to a terminal *c* and from the latter through a line *d* to a terminal *e* of the auxiliary motor 207. The other terminal *l* of the motor 207 is connected by a conductor *k* with a brush 209 of a commutator device. A second brush 208 of the commutator device is connected by a return conductor *i* with a terminal *h* which is connected by a conductor *g* with the terminal *f*. The brushes 208 and 209 are mounted in an axially adjustable carrier sleeve 210 so as to be movable therewith and they are pressed radially against the surface of a commutator drum 211. The latter is revolvably mounted in bearings 212 and 213 and is driven in synchronism with the drive shaft of the sewing machine by a pulley or sprocket 214 on such shaft geared with a pulley or sprocket 215 on the shaft of the commutator drum 211 through the medium of a belt or chain 216 which may be a toothed rubber belt. The commutator drum may be driven synchronously by other means, as by mounting it directly on the drive shaft of the machine or on the grooved driving pulley thereof. Also, instead of the brushes 208 and 209 of the commutator device being in the circuit of the auxiliary motor they may be in the circuit of a relay controlling the switch of such motor in a manner similar to that which will be described in connection with another form of commutator device illustrated in Fig. 6.

A commutator device of the kind seen in Fig. 1 will be described in greater detail with reference to Figs. 2 and 3. A shaft 217 is enclosed in a sleeve 218 of conductive metal on which the brush 208 is seen to rest. At each end of the sleeve 218 a slot is formed in the metal and such slots are occupied by insulation segments 219, 220 which are disposed so as to be at opposite ends of a diameter. Thus the brush 209 is pressed upwardly against one of these insulation segments which is at the right hand end of the sleeve 218 and is at the bottom thereof, and the brush 208 is in alignment but not in contact with the insulation segment 222 which is at the left hand end and at the top of the sleeve, in the position of rest illustrated. In this position of the parts, the circuit of the auxiliary motor shown in Fig. 1 is broken at the commutator so that the machine is at rest and this position wherein the brush 209 presses upwards against an insulation segment may correspond to the up position of the sewing machine needle. It will be apparent that by moving the adjustable sleeve 210 axially to the left, the brush 209 will be moved into contact with the conductive sleeve 218 on the shaft 217 whereas the brush 208 will be moved into contact with the insulation segment at the left hand end of such sleeve. With this new setting of the sleeve 210 and brushes 208 and 209, the circuit of the auxiliary motor 207 shown in Fig. 1 may be opened when the needle of the sewing machine is in the down position. The axial adjustment of the sleeve 210 may be effected by the aid of a Bowden wire 221 and press button 223 hereinafter described in more detail.

In Fig. 2, the contact drum member of the commutator device comprises a sleeve 219 of insulating material which is keyed, as shown, on one end part of a shaft 217 supported in its middle part by ball bearings and having keyed on its other end part the pulley or sprocket wheel 215 by which the drum member is driven from the sewing machine. A part of the length of the sleeve 219 is enclosed by a conductive metal sleeve 218 formed at one end with a slot 220 and at its opposite end with a slot 222, these slots being displaced circularly from one another by 180°. The metal sleeve 218 may be present in the moulding of the insulation sleeve 219 so that, as will be understood from Fig. 3, the insulating material fills the slots 220 and 222, the exposed surfaces of the insulating material in the slots forming continuations of the cylindrical surface of the metal sleeve 218.

In Fig. 2 the brush 209 is seen to be pressed upwards against the surface of the insulation filling the slot 220, whereas the brush 208 is pressed downwards upon the metal sleeve 218 but is in alignment axially of the spindle with the insulation filling the slot 222. Thus, the conditions are similar to those described with reference to Fig. 1. Depression of a press button 223 against the action of a spring 225 is transmitted by a Bowden wire device 221 as a leftward push (indicated by an arrow) to the carrier sleeve of the brushes 208 and 209 and this will cause the axial center of the brush 208 to come into the position A and the axial center of the brush 209 to come into the position B. With the sleeves 219, 218 remaining in the same position, the brush 208 will then press upon the insulation material in the slot 222 and the brush 209 will press against the conductive metal of the sleeve 218 and will be out of the path of the insulation in the slot 220. Consequently, during a revolution of the said sleeves, the circuit of the auxiliary motor will be broken when the insulation in the gap 222 comes beneath the brush 208 and this may correspond to a down position of the sewing machine needle. The leftward movement of the carrier sleeve for the brushes 208 and 209 is resisted by a spring 224. Consequently, when the press button 223 is released it is returned by its spring 225 and the brush carrier is returned by its spring 224 so that the parts are returned to the normal position illustrated wherein the circuit of the auxiliary motor will be broken at the brush 209 when the sewing machine needle is in the up position.

It will be apparent that instead of the Bowden wire device being operative for transmitting a push to the carrier of the brushes 208 and 209, it could be arranged so as to be operative for exerting a pull on such carrier. The relative positions of the brush carrier and contact drum could be changed from the one condition to the other by means of a lever, or by a pull or push rod, or by a chain, or by an electromagnetic clutch inserted between the auxiliary motor and the movable parts driven by the same including a contact device, and enabling this part in different positions thereof to be coupled with the auxiliary motor. From this it will be clear that the drum element could be adjusted axially in relation to fixedly supported brushes 208 and 209 just as easily as the brushes are adjusted in relation to the drum element in the example illustrated.

In Fig. 2, the press button 223 is shown mounted in a pedal 226 such as is normally provided for the control of a sewing machine. The commutator device is housed in a casing formed on its underside with an eye 229. The latter is passed on to a horizontal pin 228 carried at the upper end of a bracket arm 227. When the casing has been adjusted angularly about the pin 228 it is fixed in a desired position by tightening a set screw seen in the eye 229. The bracket arm 227 may be fastened down upon the table or other support of the sewing machine.

Referring now to Fig. 6, it will be seen that the commutator device comprises a metal disc $k4$ with inset insulating segments $c4$, $d4$. The segment $c4$ is inset at a greater radial distance than the segment $d4$ with which a single brush $St$ is seen to be in contact. This brush, however, can be moved downwards and radially of the said disc $k6$ so as to come into the circular path of the segment $c4$ and out of the path of the segment $d4$. The segments $c4$, $d4$ being inset at opposite ends of a diameter, it will be seen that the commutator device in Fig. 6 is analogous with that described with reference to Figs. 1 to 3. The shaft of the disc $k4$ runs in bearings 412, 413, supported by a bracket 402 which is bolted by a bolt 401 on the table or base plate of the sewing machine. With this arrangement the bracket 402 and the commutator device are adjustable around a vertical axis which is the axis of the bolt 401. On the said shaft is fixed a pulley 414 which is driven by a belt or chain 415 from a pulley 416 on the drive shaft (not shown) of the sewing machine. The said drive shaft is fitted with a V-pulley 430 over which runs a belt or chain 417 and in the lower part of Fig. 6, the belt or chain 417 is seen to be lapped around a V-pulley 438 driven by an auxiliary motor M1 or by a main motor M2 as hereinafter described.

In Fig. 6 the commutator device is in a low voltage circuit. Thus, the terminals $k1$, $k2$ may be connected with low voltage terminals of a transformer (not shown). Current passes from the terminal $k1$ through the coil 632 of a relay $s4$ to a terminal $k3$ which has a flexible connection $e4$ with the wire of a Bowden wire device $Bd$, which wire is in conductive connection with the brush $St$. When the latter makes contact with the metal of the disc $k4$ the current flows through the latter and its shaft 411, through the bearings 412, 413, bracket 402 and bolt 401 to a conductor $b4$ connected at one end with the terminal $k2$ and at the other end with the bolt 401. When the circuit is closed in this manner, the coil 432 of the relay $s4$ closes the relay switch 436 and this completes the circuit of the auxiliary motor M1 which is driven by a normal or suitably high voltage. The low voltage used at $k1$, $k2$ enables parts of the machine to be included in the circuit, as above described, without danger or inconvenience.

The Bowden wire of the device Bd is operated by an angle lever 406 which can be depressed against the resistance of a spring 407, and the lever 406 is shown mounted on a normal control pedal 405 of the sewing machine. Upon depressing the lever 406 the brush St is lowered by the pull of the Bowden wire Bd so that it leaves the insulation segment d4 and descends into the circular path of the segment c4. In the position illustrated with the brush St touching the segment d4 the circuit of the relay s4 is broken, so that the relay switch 436 is open and the motor M1 is at rest. In this condition, the sewing machine also is at rest and it may be assumed with the needle in the up position. When the lever 406 is depressed so that the relay circuit is broken when the brush St makes contact with the segment c4 the motor M1 and the sewing machine will come to rest with the needle in the down position.

The winding of a magnet Ma is seen to be connected in parallel with the auxiliary motor M1 and said magnet is operative upon a brake B which may be applied by the pressure of a spring (not shown) against a revolving member Bk on a shaft 440 driven by the motors as hereinafter described. When the auxiliary motor M1 is switched off, the magnet Ma releases the brake B so that it may engage the member Bk under the action of the spring. The main motor M2 has a fly wheel 418 which can be engaged by a coupling member 419 for driving the sewing machine through the belt 417. The coupling member 419 may be axially displaced toward the right or left by means of a manually actuated controlling lever 419a so that the coupling member 419 makes frictional contact either with the fly wheel 418 of the main motor M2 or with the worm wheel 421 of a worm gear 420, 421 the worm 420 of which is driven by the shaft 420' of the auxiliary motor M1. Thus when the coupling member 419 is engaged with the fly wheel 418 it is out of engagement with the parts driven by the auxiliary motor M1, but when disengaged it comes again into engagement with such parts whereupon the speed of the sewing machine is reduced. Therefore, when the main motor M2 is disconnected the auxiliary motor M1 will take over the drive at a reduced speed until the brush St makes contact with an insulating segment. Thereupon, the relay S4 is de-energized, the circuit of the motor M1 is opened so that this motor comes to rest and simultaneously the magnet Ma is de-energized and permits application of the brake B so that the sewing machine is arrested with the needle in the up or down position according to the setting of the brush St.

The disc form of commutator device used in the arrangement of Figure 6 is illustrated in greater detail in Figs. 4 and 5 wherein it will be seen that the shaft 411 of the disc k4 runs in ball bearings 412 and 413. The housing of the commutator device in this case, has a depending split eye 437 which can be passed on to and clamped in adjusted position on a horizontal pin 439 fixedly carried by the bracket 402 which is fastened down by the bolt on the table 403 as already described. A brush 441 being under the pressure of a spring 442 is arranged in a vertically slidable head 444 operated by a pull of the Bowden wire 404 against the action of a spring 446 as clearly seen in Fig. 4. Screws 410 attach cap 438 to the housing in which the bearings 412 and 413 are mounted.

I claim:

1. Stopping means for an electric motor, comprising a circuit connected to the electric motor and including a rotating contact device and brush means cooperating with said rotating contact device, a relay inserted into said circuit and controlling the same so as to switch said rotating contact device in cooperation with said brush means inserted in said circuit connected to the electric motor, said contact device including a rotating disk having insulating segments disposed in opposite halves on said disk and at different radial distances from the center thereof, said insulating segments performing circular paths when said disk rotates, means for radially adjusting said brush means relative to said disk so as to be out of said circular path of one of said segments and in the circular path of the other of said segments.

2. Stopping means for an electric motor, comprising a circuit connected to the electric motor and including a rotating contact device and brush means cooperating with said rotating contact device, a relay inserted into said circuit and controlling the same so as to switch said rotating contact device in cooperation with said brush means inserted in said circuit connected to the electric motor, said contact device including a rotating disk having insulating segments disposed in opposite halves on said disk and at different radial distances from the center thereof, said insulating segments performing circular paths when said disk rotates, means for radially adjusting said brush means relative to said disk so as to be out of said circular path of one of said segments and in the circular path of the other of said segments, a manually operated device controlling the radial adjustment of said brush means, and a Bowden wire device connecting said manually operated device with said brush means.

3. A driving means for a sewing machine having a driving shaft, said driving means including a main electric motor and an auxiliary electric motor, means for alternately drivingly connecting said main and said auxiliary motors to said shaft for driving said shaft during periods of normal operation thereof by said main motor and for driving of said shaft by said auxiliary motor after said main motor has become inoperative, an electric circuit for said auxiliary motor including a switch in series with said auxiliary motor, said switch comprising a contactor means and a commutator movable relative to said contactor means, said commutator being rotatable about an axis, said commutator comprising a cylinder, said cylinder having a current carrying first portion and two insulated second portions arranged diametrically opposite each other and spaced from each other longitudinally along said cylinder, said portions extending concentric with respect to the axis of said commutator, said contactor means being positioned in contact with said first portion, said contactor means being movable longitudinally with respect to said commutator alternately into alignment with the path of one of said second portions during rotation of said commutator to effect deenergization of said auxiliary motor alternately at one of two rotational positions of said shaft, means connected to said commutator and said shaft for rotating said commutator in synchronism with said shaft means for moving said commutator laterally of said contact.

4. The apparatus of claim 3 including a hand operated control device for adjusting said contact with respect to said cylinder and a Bowden wire operatively connecting said control device with said brush means.

References Cited in the file of this patent

UNITED STATES PATENTS

| Re. 15,125 | Lindquist | June 14, 1921 |
| 1,305,594 | Furlow | June 13, 1919 |
| 1,699,785 | Geiger et al. | Jan. 22, 1929 |
| 1,738,672 | Saurman | Dec. 10, 1929 |
| 1,774,737 | Topham | Sept. 2, 1930 |
| 1,849,847 | Mittnacht | Mar. 15, 1932 |
| 1,913,595 | Hyman et al. | June 13, 1933 |
| 2,321,556 | Raskhodoff | June 8, 1943 |
| 2,517,567 | Hill et al. | Aug. 8, 1950 |
| 2,544,448 | Downey | Mar. 6, 1951 |
| 2,604,864 | Merchant | July 29, 1952 |
| 2,621,620 | Chatfield et al. | Dec. 16, 1952 |
| 2,692,667 | Bliedung et al. | Oct. 26, 1954 |

FOREIGN PATENTS

| 777,654 | France | Dec. 5, 1934 |